United States Patent Office 2,987,420
Patented June 6, 1961

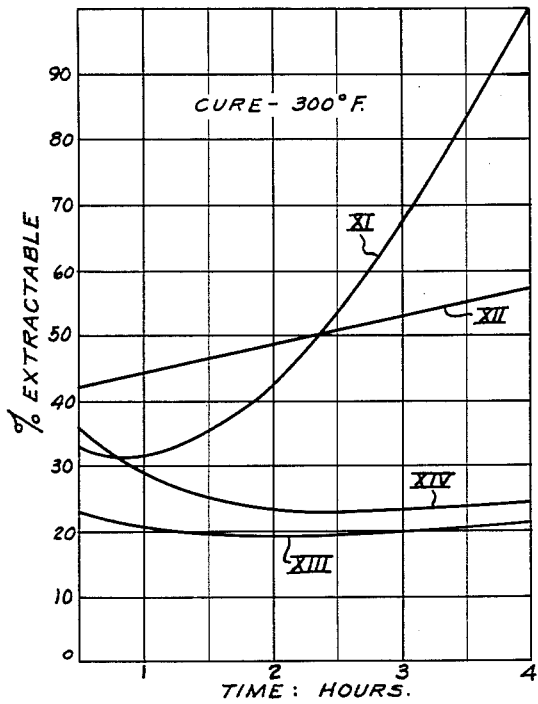
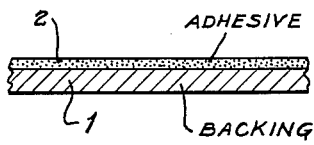
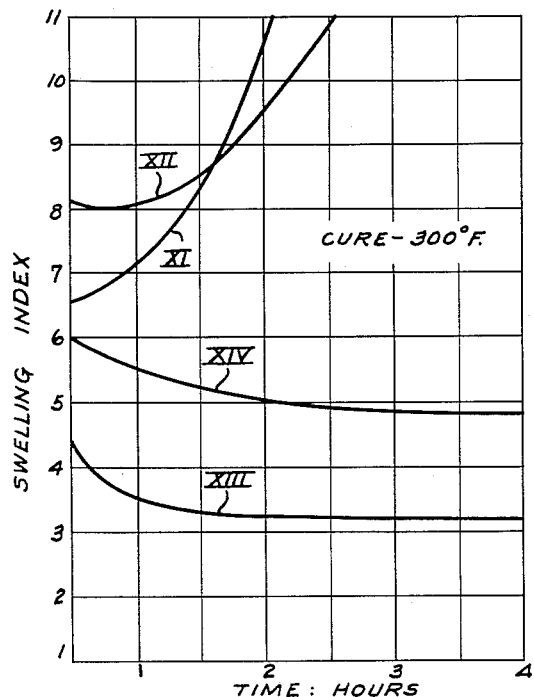

2,987,420
PRESSURE SENSITIVE ADHESIVE COMPOSITION CONTAINING LONG CHAIN PHENOL ALDEHYDE CURING RESIN AND TAPE MADE THEREFROM
Cyrus W. Bemmels, New Brunswick, N.J., and Domenick Donald Gagliardi, East Greenwich, R.I., assignors to Johnson & Johnson, New Brunswick, N.J., a corporation of New Jersey
Filed Apr. 5, 1960, Ser. No. 20,219
14 Claims. (Cl. 117—122)

This invention relates to adhesive compositions and, more particularly, to normally tacky and pressure-sensitive adhesive compositions having improved high temperature stability. Also, within the scope of this invention are improved normally tacky and pressure-sensitive adhesive tapes utilizing the novel adhesive masses of this invention.

Conventional normally tacky and pressure-sensitive adhesives are compounded from a composition including an elastomeric component, which is usually a natural or synthetic rubber or similar elastomeric polymer, and a resinous component compatible with the rubber and adapted to impart tack to the adhesive composition, together with suitable amounts of various types of additives such as conventional fillers, tackifying resins, stabilizers, etc.

In certain applications, it is desirable that the adhesive be of the "heat curing" pressure-sensitive type also known as "thermosetting adhesives." By the term "heat curing" is meant pressure-sensitive adhesives which are converted from a plastic soluble condition to a non-plastic insoluble state through the application of heat. In the painting of transportation vehicles, appliances and similar objects, hot air forced drying and curing operations are used. Thus masking tapes used in such industries must be designed to withstand these temperatures without failing or leaving a deposit on the job. In addition the adhesives of the masking tapes must be non-staining for all light colored surfaces. For these masking operations, the adhesives of this invention performs very satisfactorily.

In the electrical industry, electrical grade pressure-sensitive tapes are commonly used to hold wires as well as serve as an insulating barrier in the manufacture of coils, transformers and electric motors. The tapes become an integral and permanent part of the units. Heat curing pressure-sensitive adhesives are very widely used for this application. The adhesive is cured during the normal prebake cycle commonly used to rid the unit of moisture. During the subsequent varnish dip, wax dip, potting or encapsulating operation, a heat cured adhesive remains undissolved, thus providing a continuous bond and no contamination of the dip or potting compounds. Contamination can be a serious problem since it affects the drying and curing properties of these insulating materials and may ruin their properties. The adhesives of this invention are particularly suitable for this application since they have good electrical properties and good high temperature stability. The latter is extremely important since electrical units are being baked at higher times and temperatures than previously and are being designed to operate at higher temperatures. This is particularly true regarding electrical motors. If a non-curing or a poorly cured adhesive tape is used and the motor operates for extended periods at an elevated temperature the centrifugal force of the motor tends to throw the adhesive to the outer surfaces, and the adhesive soon gums up the motor, slows it down and may cause the unit to fail.

The use of oil-soluble reactive phenol-formaldehyde resins to produce heat curing adhesives is known. The heretofore used heat-curing adhesives, employing oil soluble rubber reactive phenol-formaldehyde resins in amounts of 10 to 25 parts per 100 parts of rubber, have not been entirely satisfactory because of their slow curing qualities and because of their tendency to revert from an insoluble to a soluble state at high temperatures of 300° F. and higher. Examples of resins which have been previously used for producing heat curing adhesives are those made from para phenyl phenol or para tertiary butyl phenol or para tertiary amyl phenol and formaldehyde.

Previous attempts to improve the heat stability and the heat curing properties of the known heat curing adhesives by using larger amounts of curing agent have been unsuccessful since the use of larger amounts of these resins produced a marked drop in the pressure-sensitive or "quick-tack" properties of these adhesives.

Accordingly, it is an object of the invention to provide novel normally tacky and pressure-sensitive heat curing adhesives which are fast curing, stable at elevated temperatures for extensive periods of time and which exhibit good "quick-tack" characteristics. Another object of this invention is to provide novel normally tacky and pressure-sensitive heat curing adhesive tapes, particularly useful as marking tapes and electrical tapes, which are fast curing, stable at elevated temperatures for extensive periods of time and which exhibit good "quick-tack" characteristics. Another object of this invention is to provide a novel method for the manufacture of normally tacky and pressure-sensitive heat curing adhesive tapes having the characteristics set forth in the foregoing objects.

Of the drawings:
FIGURE 1 is a cross-sectional view of a pressure-sensitive, heat curing adhesive tape prepared in accordance with this invention;
FIGURE 2 shows curves of the "percent extractable" of two adhesive tapes prepared in accordance with this invention compared with two previously known adhesive tapes; and
FIGURE 3 shows curves of the "swelling index" of two adhesive tapes prepared in accordance with this invention compared with two previously known adhesive tapes.

In accordance with this invention, pressure-sensitive, heat curing adhesives having very good heat stability and good "quick-tack" characteristics are formed by incorporating into adhesive compositions comprising a curable elastomeric polymer and a tackifier compatible with the elastomeric polymer and adapted to render the composition tacky and pressure-sensitive, a phenol-aldehyde resin made from an alkyl phenol in which the alkyl group contains at least nine carbon atoms and preferably in which the alkyl group is highly branched. More particularly, the phenol-aldehyde resin of the type indicated above is in an amount from about 35 to 100 parts per 100 parts of elastomeric polymer. Excellent results have been obtained wherein the para alkyl group is a branched chain containing from nine to fifteen carbon atoms.

The phenolic resins used in this invention are made by the alkaline condensations of an alkyl phenol of the type indicated hereinbefore with an aldehyde. The ratio of aldehyde to phenol may be from about 0.9 to 2.0 of aldehyde per mole of phenol. The use of more than 2 moles of aldehyde is not desirable since the phenol has only two reactive groups and the excess aldehyde is wasted. Theoretically, more than 1 mole of aldehyde per mole of phenol is needed in order to get a resin with heat curing properties. However, it was found that reacting less than 1 mole of formaldehyde per mole of phenol will provide a resin which cures rubber. Presumably, the resin consists of a mixture of unreacted phenol and a phenol-aldehyde resin. The preferred range is 1.1 to 1.5 moles of aldehyde per mole of phenol. The state of condensation of the resin has a bearing on its tack producing and curing properties. The resins of a high state of condensation (preferably solid resins) produce better cures and better pressure-sensitive tack properties than the low molecular weight resins. Likewise the resins with lower aldehyde contents are to be preferred. This is contrary to what would be expected since the methylol content (which is believed to be the rubber reactive group) is actually lower in the high molecular weight resins than in the corresponding low molecular weight counterpart. It is believed this may be due to the improved solubility of the resin in the elastomeric polymer as the methylol content is reduced. Of course this invention is not limited to any theory of action as to what occurs between the phenolic curing agent and the elastomeric polymer.

It has been found that a good method for preparing these resins is to heat the alkyl phenol and para formaldehyde in the presence of a trace of alkali (about 0.01 mole per mole of alkali) in a one-step operation. The trace of alkali does not appear to affect the electrical properties. The reaction may be conveniently carried out under reflux conditions in toluene or a similar suitable solvent. The water is decanted from the reflux solvent and serves as a convenient means of measuring the extent of resin condensation. The extent of condensation is dependent upon the time and temperature.

Any curable elastomeric polymer conventionally used in normally tacky and pressure-sensitive adhesives may be employed in accordance with this invention. Examples of suitable elastomeric polymers for this purpose are isoprene polymers, such as natural rubber, reclaimed rubber, diene-styrene copolymers containing at least 50% and preferably, at least 70% butadiene; polybutadiene; isobutylene-diene copolymers, such as butyl rubber, an isobutylene-isoprene copolymer; and chloroprene polymers.

As indicated heretofore, the adhesives of the present invention may include tackifiers. By the term "tackifiers" is meant those materials which impart tack to or improve tack of the adhesive. This would include those materials conventionally employed in the formation of pressure-sensitive adhesives as, for example, rosin, hydrogenated rosin, dehydrogenated rosin, the glycols and glycerides of any of these resinous materials, polyterpenes, coumarone-indene resins, polyalkyl styrenes, etc. The term is also meant to include liquid materials such as liquid resins and plasticizers which are used to improve the tack of the adhesives. The tackifier is employed in amount sufficient to render the adhesive composition tacky and pressure-sensitive at normal temperatures, usually about 25–125 parts per 100 parts by weight of the elastomeric polymer.

The pressure-sensitive adhesive of this invention can be formed in any conventional manner as, for example, by compounding on a conventional rubber mill or Banbury type mixer, dispersing in an internal mixer such as a Baker-Perkins mixer, etc. Preferably the adhesives are formed by compounding in a Banbury type mixer, the elastomer and fillers, if used, with a portion of the tackifier and thereafter mixing the formed compound with the solvent and remaining components of the composition to obtain a relatively homogeneous solution of the adhesive.

The formulation may be free of or include, in conventional amounts, fillers such as zinc oxide, magnesium carbonate, calcium carbonate, lead oxide, clay, titanium dioxide, aluminum, hydrated alumina, pulverized glass, silica, etc. Other conventional ingredients for such formulations, such as antioxidants or heat stabilizers, dyes or pigments, plasticizers, etc., may be present or absent dependent upon the particular desired use of the adhesive composition.

In the formation of pressure-sensitive adhesive tapes employing the improved heat curing adhesives of this invention, the adhesive is applied in any suitable manner to any conventional backing for tapes such as paper, cloth, nonfibrous films (e.g. cellophane, vinyl resins, polyethylene, etc.) etc. As shown in FIG. 1 of the accompanying drawing, the adhesive tape formed comprises a backing 1 and an adhesive coat 2. If desired the backing may be provided with a suitable conventional priming coating to improve the adherence of the adhesive thereto. Suitable primer coatings are those exemplified in the patent to Bemmels 2,647,843 issued August 4, 1953.

The following are examples of normally tacky and pressure-sensitive adhesives and adhesive tapes having improved characteristics and formed in accordance with this invention. It will be appreciated that these formulations are exemplary and the invention should not be construed as limited to the particular materials and proportions listed. Unless otherwise indicated, all proportions recited are in parts by weight.

EXAMPLE I

A good electrical grade pressure-sensitive paper tape with excellent high temperature resistance may be prepared by coating the following adhesive at a coating weight of 2.0 oz. per square yard onto a 30 lb. creped kraft saturating paper which had been previously treated with a standard electrical grade impregnant and backsize:

| | Parts |
|---|---|
| Pale crepe | 100 |
| CaCO$_3$ | 58 |
| "Santovar A" (tertiary amyl hydroquinone) | 2 |
| Heat-curing resin A | 51 |
| Polyterpene resin (melting point 115° C.) | 41 |

Resin A was made in a 1 liter flask equipped with a reflux condenser and decanter. 220.0 g. of nonyl phenol (1 mole) was charged into the flask. 49.5 parts of a 91% paraformaldehyde (1.5 moles) was added and 11.0 parts of a 20% NaOH solution (0.055 mole) was finally added. The mix was heated and stirred at 90° for 2 hours. Then 126.3 g. toluene was added and the solution azeotroped for approximately 2 hours. The final solution viscosity was "J" on the Gardner-Holdt scale (25° C.). This resin had a softening range of 46–80° C. as measured on the Kofler Heizbank melting point apparatus.

EXAMPLE II

The following adhesive was coated on 1 mil primed polyethylene terephthalate film (manufactured by Du Pont, Wilmington, Delaware, and sold under the trade name "Mylar") at a coating weight of about 1.2 oz. per square yard. The primer used is described in Bemmels Patent 2,647,843:

*Adhesive*

| | |
|---|---|
| Pale crepe | 100 |
| CaCO$_3$ | 58 |
| "Santovar A" (tert. amyl hydroquinone) | 2 |
| Heat-curing resin B (nonyl phenol formaldehyde resin | 1 53.3 |
| Polyterpene resin (M.P. 115° C.) | 46.7 |

[1] Dry weight.

Resin B was made on a plant scale in accordance with the procedure outlined for resin A. The final solution viscosity was "L" (Gardner-Holdt scale). Softening range of the resin was 46–82° C.

The tape in this example had a very good "quickstick," an adhesion of 20 oz. per in. width per ASTM D-1000 method, and cured to an insoluble state in less than 1 hour at 250° F.

The following adhesives were coated on primed "Mylar" as in Example II.

|  | Example III | Example IV | Example V |
|---|---|---|---|
| Pale Crepe | 100 | 100 | 100 |
| Aluminum Hydrate | 58 | 58 | 58 |
| Tert. Amyl Hydroquinone (Santovar A) | 2 | 2 | 2 |
| Heat Curing Resin B | 60 | | |
| Heat Curing Resin C | | 46.7 | 53.3 |
| Polyterpene Resin (M.P. 115° C.) | 40 | 53.3 | 46.7 |
| Adhesion | 45 | 18 | 1 |
| Cures to an insoluble state at 250° F., hrs. | 1 | 1 | 1 |
| Quick-Stick | Excellent | Fair | Fair |

Heat curing resin C is a commercial resin made from the alkaline condensation of para tertiary octyl phenol and formaldehyde which has a melting point of about 87° C. and is sold under the trade name "Amberol ST 137."

Examples IV and V show the unsuitability of using an alkyl phenol formaldehyde in which the alkyl group has less than 9 carbon atoms. One will readily note the inferior "quick-stick" and adhesion when resin C is used.

Example VI which follows shows the unsuitability of using a resin made from the alkaline condensation of amyl phenol and formaldehyde.

EXAMPLE VI

A tape was made by coating on a 1 mil "Mylar" film at a dry coating weight of 1 oz./sq. yd. an adhesive composition dissolved in toluene having the following recipe:

| | |
|---|---|
| GRS | 50 |
| Pale crepe | 50 |
| Atomite | 12.5 |
| Ditertiary amyl hydroquinone | 1.0 |
| Tertiary amyl phenol-formaldehyde resin | ¹54 |

¹ 82 grams solution.

The adhesive coating was cloudy and left a heavy ghost deposit when applied to a glass panel indicating the resin to be incompatible in the amount used and unsatisfactory for normal pressure sensitive tape uses.

The above-referred to amyl phenol-formaldehyde resin was made as follows:

Charge 123.1# p-tertiary amyl phenol (0.75 mole)
121.5# 37% formaldehyde (1.5 moles)
15.0# sodium hydroxide (0.37 mole)
135.0# water
22.5# acetic acid
123.0# toluene

Process (1) Charged phenol, sodium hydroxide, and water together into 3 neck, 1 liter flask fitted with stirrer, condenser, and thermometer.
(2) Added aqueous formaldehyde to the slurry and heated to reflux at 101° C. for 20 minutes.
(3) Stopped heating reaction mixture and poured out the charge into a beaker.
(4) On neutralizing with acetic acid, a taffy-like resin separated out of solution.
(5) The water layer was decanted and the resin was taken up in 123.0# toluene.
(6) The cloudy toluene solution was transferred to a separatory funnel and the small amount of water which separated on standing was removed.
(7) The toluene solution was then salted with 50 gms. sodium chloride and filtered.
(8) The red-amber toluene solution had a solids content of 65.8%.

EXAMPLE VII

This adhesive was coated on primed "Mylar" as in Example II:

| | |
|---|---|
| Pale crepe | 100 |
| Aluminum hydrate | 58 |
| Santovar A (tert. amyl hydroquinone) | 2 |
| Heat curing resin B | 80 |
| Polyterpene resin (M.P. 115° C.) | 70 |

This tape had excellent "quick-stick," an adhesion of 70 oz./inch width, and cured to an insoluble state at 250° F. in less than an hour.

EXAMPLE VIII

Primed "Mylar" was coated as in Example II with the following adhesive:

| | |
|---|---|
| Pale crepe | 100 |
| Aluminum hydrate | 58 |
| Tertiary amyl hydroquinone (Santovar A) | 2 |
| Heat curing resin D | 66.7 |
| Polyterpene resin (M.P. 115° C.) | 33.3 |

Heat curing resin D was made by reacting 0.9 mole of para formaldehyde with 1 mole of nonyl phenol in the presence of 0.05 mole of NaOH. The methylolated product was then heated 1 hour at 120° C. The resulting resin had a softening range of 82–110° C.

This tape had good "quick-stick," an adhesion of 26 oz./inch width, and cured to an insoluble state in 2 hours at 250° F.

EXAMPLE IX

A very satisfactory pressure-sensitive tape was made by coating primed "Mylar" as in Example II with the following adhesive:

| | |
|---|---|
| Pale crepe | 100 |
| $CaCO_3$ | 58 |
| Tert. amyl hydroquinone (Santovar A) | 2 |
| Heat curing resin A | 53.3 |
| Glycerol ester of hydrogenated rosin (Staybelite Ester #10) M.P. about 85° C. | 46.7 |
| Circosol 2 x H | 20 |

The resulting tape had very good "quick-stick," an adhesion of 30 oz./inch width, and cured to an insoluble state in less than 1 hour at 250° F.

EXAMPLE X

A good pressure-sensitive tape was made by substituting for the Staybelite Ester #10 of Example IX an equivalent weight of Schenectady Resin SP 559B. This is a polyterpene phenolated resin with a melting point of about 115° C. and a phenolic content of approximately 14%. "Quick-stick" of this tape was very good, adhesion was 35 oz./inch width and the adhesive cured to an insoluble state in 1 hour at 250° F.

EXAMPLE XI

A pressure-sensitive tape was made by coating primed "Mylar" film as in Example II with the following adhesive:

| | |
|---|---|
| Pale crepe | 100 |
| Aluminum hydrate | 58 |
| Tert. amyl hydroquinone (Santovar A) | 2 |
| Heat curing resin E | 80 |
| Polyterpene resin (M.P. 115° C.) | 20 |

Resin E was made by the same procedure as for resin A except that dodecyl phenol replaced the nonyl phenol, mole for mole. The viscosity of the 66.6% solids resin solution in toluene was "P" at 25° C. (Gardner-Holdt).

The tape had very good "quick-stick," an adhesion of 27 oz./inch width and cured to an insoluble state in about 1 hour at 250° F.

| Examples | XII | XIII | XIV | XV |
|---|---|---|---|---|
| Pale Crepe | 100 | 50 | 100 | 50 |
| GRS (71 butadiene 29 styrene) MR 4 Mooney 60 | | 50 | | 50 |
| Aluminum Hydrate | 58 | | | |
| Calcium Carbonate | | 30 | 60 | 10 |
| Santovar A (tertiary amyl hydroquinone) | 2 | 2 | 2 | 2 |
| Heat Curing Resin C | 16 | 33 | | |
| Heat Curing Resin A | | | 50 | 50 |
| Polyterpene Resin (M.P. 115° C.) | 16 | 44 | 38 | 22.5 |
| Polyterpene Resin (M.P. 70° C.) | 16 | | | |
| Zinc Rosinate (M.P. 135° C.) Zinc content by capillary method, 9% | 30 | 11 | | |
| Paracoumarone-indene resin Softening Point 128-136° C. (Ball and Ring) | | 33 | | 13.5 |
| Lanolin | 10.5 | | | |
| Lecithin | 5.5 | | | |

Examples XII and XIII represent commercial adhesives of the prior art. Examples XIV and XV are examples of this disclosure. These adhesives were coated on "Mylar" film at a coating weight of about 1.2 oz./sq. yd. The tapes had good pressure-sensitive tack. Example XIV cured to an insoluble state in less than 1 hour at 250° F. The other three examples cured to the same state in 1–2 hours at 250° F.

These tapes were also cured for varying lengths of time at 300° F. The samples were weighed, immersed in an aliphatic solvent for 15 hours during which time the adhesive film swelled and separated from the "Mylar" film. The wet adhesive was allowed to drain for 10 seconds and the weight of the adhesive film plus entrained solvent was measured. The adhesive film was dried and the weight of the extracted film determined. Swelling index and percent extractible were measured by these formulae:

$$\text{Swelling index} = \frac{\text{Wet weight of adhesive film}}{\text{Final weight of adhesive film}}$$

Percent extractible $$= 100\% - \left(\frac{\text{Final weight of adhesive film} \times 100}{\text{Original weight of adhesive film}}\right)$$

The swelling index is a measure of the amount of solvent taken up by the cured adhesive film and is a measure of the degree of cure—the lower the value the tighter the cure. The percent extractible is a measure of the non-cured and non-curing constituents of the adhesive and represents that portion which can contaminate waxes, varnishes, potting compounds and other insulating materials which might contact the adhesive. Curves for the percent extractible and the swelling index for the tapes prepared in accordance with Examples XII to XV are shown in FIGURES 2 and 3. It should be noted that the adhesives of this invention are far superior, both initially and after extended heat cycles, to the prior art adhesives.

EXAMPLE XVI

A very satisfactory pressure-sensitive tape with good curing characteristics and heat stability may be prepared by coating the following adhesive on 80 x 80 grey goods cotton cloth at a coating weight of 3.5 oz. per square yard:

| | |
|---|---|
| Pale crepe | 40 |
| Neoprene AC soft | 60 |
| Calcium CO₃ | 23 |
| Heat curing resin E | 60 |
| Glycerol ester of hydrogenated rosin (Staybelite Ester #10) | 40 |
| Circosol 2xH | 40 |
| Santovar A | 2 |

EXAMPLE XVII

A satisfactory pressure sensitive tape with good high temperature mass stability may be prepared by coating the following adhesive at a coating weight of 0.9 oz. per square yard onto 1.6 mil plain untreated "cellophane" which has been primed in accordance with U.S. Patent No. 2,340,298:

| | |
|---|---|
| Pale crepe | 40 |
| Enjay Butyl 217 rubber | 60 |
| CaCO₃ | 23 |
| Heat curing resin E | 60 |
| Staybelite Ester #10 | 40 |
| Liquid polyisobutylene (1200 approx. molecular weight) | 20 |
| Circosol 2xH | 20 |
| Santovar A | 2 |

Enjay Butyl 217 is an isobutylene-isoprene copolymer with an ML 212° F., Mooney viscosity of 65, and a mole percent of isoprene of 1.5–2.0%.

In application Serial No. 611,911, filed on September 25, 1956, by Ralf Korpman (now abandoned), there is disclosed the use of liquid tackifiers in adhesive compositions for producing adhesive compositions of "high stick" characteristics. Adhesives produced in accordance with this invention employing phenolic resins of the type indicated hereinbefore and liquid tackifiers exhibit excellent "quick stick" characteristics and heat stable characteristics. Examples of tapes employing such adhesives are shown in the following examples:

EXAMPLES XVIII–XXI

The following adhesives were coated on primed "Mylar" as in Example II:

| | |
|---|---|
| Pale crepe | 100 |
| CaCO₃ | 58 |
| Tertiary amyl hydroquinone (Santovar A) | 2 |
| Heat curing resin B | ¹ 80 |
| Liquid tackifier | 60 |

¹ Dry weight.

| Examples | XVIII | XIX | XX | XXI |
|---|---|---|---|---|
| Circosol 2xH | 60 | 20 | 20 | 20 |
| Polyterpene liquid softening point (10° C.) | | 40 | | |
| Hercolyn | | | 40 | |
| Abitol | | | | 40 |
| Test Results: | | | | |
| Adhesion | 33 | 47 | 36 | 35 |
| Time to cure to an insoluble state at 250° F, hrs | 1 | 1 | 1 | 2 |

All samples had excellent "quick-stick."

Circosol 2xH is a viscous clear hydrocarbon liquid sold by Sun Oil Co. with the following physical properties:

| | |
|---|---|
| Specific gravity at 60° F. | 0.9465 |
| Viscosity, SUS, at 210° F. | 85 |
| Aniline point ° F. | 175 |
| Aromatics Percent by weight | 48 |

Hercolyn is the hydrogenated methyl ester of rosin sold by Hercules Powder Co. It is a liquid with a viscosity of Z–Z3 at 25° C. (Gardner-Holdt). Abitol is a technical grade hydroabietyl alcohol sold by Hercules Powder Co. It is a balsam-like liquid.

The invention in its broader aspects is not limited to the specific methods, compositions, combinations and improvements shown and described but departures may be made therefrom.

This application is a continuation-in-part application of our co-pending application Ser. No. 617,747, filed October 23, 1956, now abandoned.

What is claimed is:

1. A normally tacky and pressure-sensitive adhesive composition of high temperature stability and good "quick-tack" characteristics comprising a curable elastomeric polymer, a tackifier compatible with the elastomeric polymer and in an amount to render the composition tacky and pressure-sensitive at normal temperatures and an alkyl phenol-aldehyde curing resin wherein the alkyl group contains at least 9 carbon atoms, the curing resin being in an amount from about 35 to 100 parts by weight per 100 parts elastomeric polymer.

2. A normally tacky and pressure-sensitive adhesive according to claim 1 wherein the alkyl group of the alkyl phenol-aldehyde resin is a branched chain containing 9 to 15 carbon atoms.

3. A normally tacky and pressure-sensitive adhesive according to claim 2 wherein the curing agent is a nonyl phenol-formaldehyde resin.

4. A normally tacky and pressure-sensitive adhesive according to claim 2 wherein the elastomeric polymer is natural rubber.

5. A normally tacky and pressure-sensitive adhesive according to claim 2 wherein the elastomeric polymer is a butadiene-styrene copolymer.

6. A normally tacky and pressure-sensitive adhesive tape having high temperature stability and good "quick-stick" characteristics comprising a suitable backing coated on at least one major surface thereof with an adhesive comprising a curable elastomeric polymer, a tackifier compatible with the elastomeric polymer and in an amount to render the composition tacky and pressure-sensitive at normal temperatures and an alkyl phenol-formaldehyde curing resin wherein the alkyl group contains at least 9 carbon atoms, the curing resin being in an amount from about 35 to 100 parts by weight per 100 parts elastomeric polymer.

7. A normally tacky and pressure-sensitive adhesive tape according to claim 6, wherein the alkyl group of the alkyl phenol-formaldehyde resin is a branched chain containing 9 to 15 carbon atoms.

8. A normally tacky and pressure-sensitive adhesive tape according to claim 6 wherein the curing agent is a nonyl phenol-formaldehyde resin.

9. A normally tacky and pressure-sensitive adhesive tape according to claim 6 wherein the elastomeric polymer is natural rubber.

10. A normally tacky and pressure-sensitive adhesive tape according to claim 6 wherein the elastomeric polymer is a butadiene-styrene copolymer.

11. The method of manufacturing a normally tacky and pressure-sensitive adhesive tape of high heat stability and good "quick-tack" characteristics which comprises coating on at least one major surface of a backing an adhesive composition comprising a curable elastomeric polymer, a tackifier compatible with the elastomeric polymer and in an amount to render the composition tacky and pressure-sensitive at normal temperatures and an alkyl phenol-formaldehyde curing resin wherein the alkyl group contains at least 9 carbon atoms, the curing resin being in an amount from about 35 to 100 parts by weight per 100 parts elastomeric polymer.

12. The method of manufacturing a normally tacky and pressure-sensitive adhesive tape according to claim 11 wherein the alkyl group of the alkyl phenol-formaldehyde resin is a branched chain containing 9 to 15 carbon atoms.

13. The method of manufacturing a normally tacky and pressure-sensitive adhesive tape according to claim 12 wherein the curing agent is a nonyl pheol-formaldehyde resin.

14. The method of manufacturing a normally tacky and pressure-sensitive adhesive tape according to claim 12 wherein the elastomeric polymer is natural rubber.

References Cited in the file of this patent

UNITED STATES PATENTS

| | | |
|---|---|---|
| 2,532,374 | Shepard | Dec. 5, 1950 |
| 2,540,592 | Newburg et al. | Feb. 6, 1951 |
| 2,553,816 | Ebel | May 22, 1951 |
| 2,607,709 | Simpson et al. | Aug. 19, 1952 |
| 2,615,059 | Bemmels | Oct. 21, 1952 |
| 2,708,192 | Joesting et al. | May 10, 1955 |
| 2,749,323 | Schaefer et al. | June 5, 1956 |
| 2,758,953 | Cottle et al. | Aug. 14, 1956 |

OTHER REFERENCES

Ser. No. 357,662, Wildschut (A.P.C.), published April 20, 1943.

UNITED STATES PATENT OFFICE
CERTIFICATE OF CORRECTION

Patent No. 2,987,420 June 6, 1961

Cyrus W. Bemmels et al.

It is hereby certified that error appears in the above numbered patent requiring correction and that the said Letters Patent should read as corrected below.

In the drawings, Figs. 2 and 3, for "XI, XII, XIII, and XIV" read -- XII, XIII, XIV, and XV --, respectively; column 1, line 42, for "performs" read -- perform --; column 2, line 23, for "marking" read -- masking --.

Signed and sealed this 12th day of December 1961.

(SEAL)
Attest:

ERNEST W. SWIDER
Attesting Officer

DAVID L. LADD
Commissioner of Patents
USCOMM-DC